Aug. 27, 1929.     T. KISHIMOTO     1,726,395

CLEAR VISION APPARATUS FOR RAPID RUNNING VEHICLES OR SHIPS

Filed April 3, 1928

Inventor
Taro Kishimoto
By Attorneys
Connolly Bros.

Patented Aug. 27, 1929.

1,726,395

UNITED STATES PATENT OFFICE.

TARO KISHIMOTO, OF TOKYO, JAPAN.

CLEAR-VISION APPARATUS FOR RAPID-RUNNING VEHICLES OR SHIPS.

Application filed April 3, 1928, Serial No. 267,063, and in Japan June 24, 1927.

This invention relates to clear vision apparatus, and more particularly clairvoyant apparatus for rapid running vehicles or ships, which can be given the clear sight of the front view to drivers in the rain or snow fall.

The clairvoyant apparatus according to this invention consists of a channel shaped casing into which a transparent prismatic body is inserted so as to gradually decrease the wind passage and form a vertical passage between the back side of the prismatic body and a glass plate attached to the front side of the vehicle or ship. Rain or snow which is blown up to the said glass plate is swept down by the air current caused by driving the vehicle or ship rapidly through the vertical passage, whereby a certain portion of the glass plate may be kept clear from rain or snow.

One object of this invention is to diminish the mental fatigue of drivers by removing the disturbance to the visual power. Other object of this invention is to prevent accident which may occur in driving vehicles or ships and maintain safety of communication during the rain or snow fall.

My invention is illustrated more or less diagrammatically in the accompanying drawings, wherein.

Figure 1:
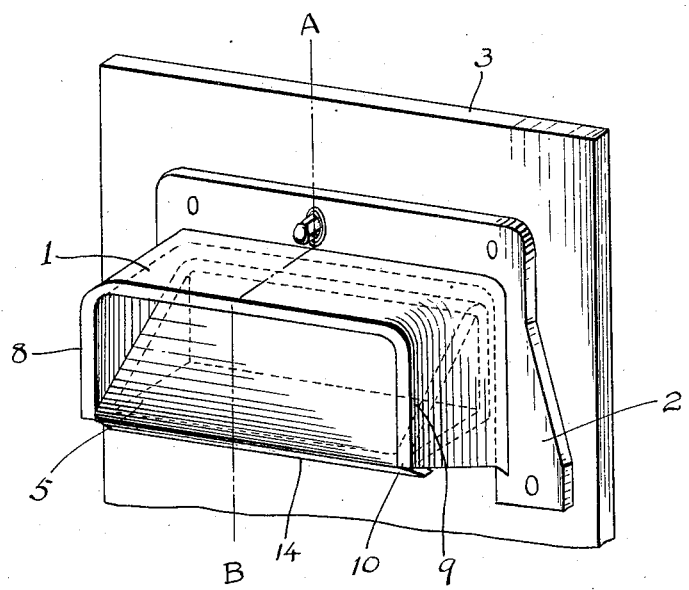
Fig. 1 is a perspective view of the clairvoyant apparatus according to this invention.
Figure 2:
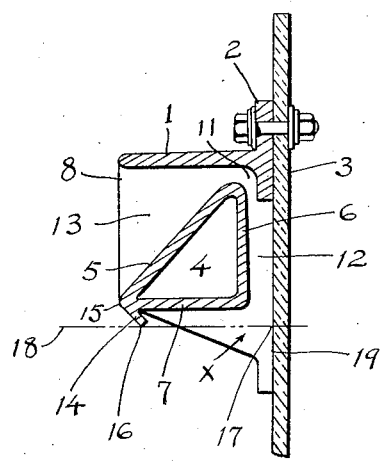
Fig. 2 is a longitudinal section of the apparatus at line A B in Fig. 1.

A casing 1 of channel type having a flange 2 is fitted on the front surface of a glass plate 3 by any suitable manner for example by bolts and nuts as shown in the drawings. 4 is a hollow transparent prismatic body consisting of an inclined plate 5, vertical plate 6 and horizontal plate 7, both ends of which are attached to the side walls 8 and 9 of the casing 1 by any convenient means. But, if required, this prismatic body may be made integral with the casing 1. The inclined plate 5 extends diagonally upward from the bottom part 10 of the side walls to gradually decrease the area of the wind passage 13 and constitute a curved passage 11 at its top end. A vertical passage 12 is formed between the vertical plate 6 and glass plate 3. 14 is a deflector extending downwardly from the bottom edge 15 of the inclined plate 5. The casing 1 is preferably fitted on the glass plate 3 at the height suitable for drivers.

Air current produced by the propulsion of rapid running vehicles or ships are forced into the curved passage 11 along the upper surface of the inclined plate 5 and then pass down the vertical passage with high speed, whereas the wind at the bottom side of the inclined plate is deflected downward by the deflector 14. At this time, rain or snow accompanied by the wind will be caught by means of the inclined plate and if there is any rain or snow to introduce into the curved passage, it will be forced downward by the rapid air current and does not contact the front surface of the glass plate.

Rain or snow passing under the tip 16 of the deflector 14 will be shifted to the resultant direction formed by the direction of the wind and that of gravity and impinges always on the glass plate at a certain distance below the point 17 which is at the intersection of the horizontal line 18 to the glass plate. Moreover rain or snow to be blown up to the glass plate in the direction of an arrow $x$ may be swept down by the rapid air current passing through the passage 12, and cannot be touched at the glass plate near the point 17, so that the portion 19 on the glass plate situated at a certain distance below the horizontal line 18 is always kept clear to get the correct sight.

I claim:

1. Clear vision apparatus comprising a channel shaped casing suitably fitted on the front surface of the glass plate, a prismatic body inserted in the said casing to gradually decrease the wind passage and form the vertical wind passage between the back side of the said prismatic body and the front surface of the glass plate.

2. Clear vision apparatus comprising a channel shaped casing fitted at the height suitable for the driver on the front surface of the glass plate, a hollow transparent prismatic body consisting of the inclined plate, vertical and horizontal plates, and having the deflector extending downward from the bottom edge of the inclined plate, the said prismatic body is inserted in the casing to gradually decrease the wind passage and constitute the curved passage at its top end, the vertical passage communicating to the said curved passage is formed between the vertical plate of the prismatic body and the front surface of the glass plate.

In testimony whereof I affix my signature.

TARO KISHIMOTO.